United States Patent Office 2,856,272
Patented Oct. 14, 1958

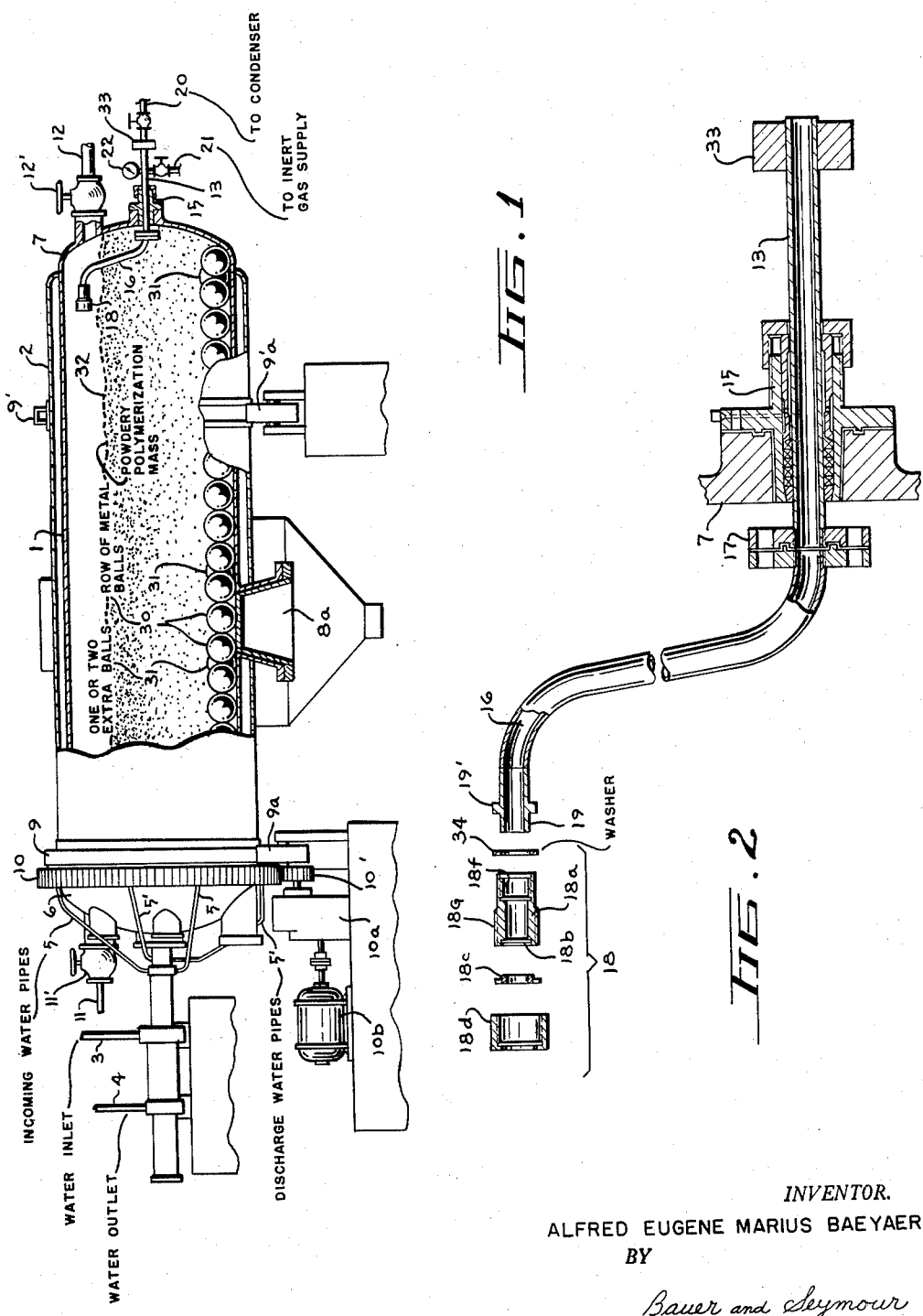

2,856,272

POLYMERIZER APPARATUS

Alfred Eugene Marius Baeyaert, Bron, Paris, France, assignor to Societe Anonyme des Manufactures des Glaces et Produits Chimiques de Saint-Gobain Chauny & Cirey, Paris, France Application October 8, 1953, Serial No. 384,887

Claims priority, application France July 29, 1952

3 Claims. (Cl. 23—286)

This invention relates to the manufacture of thermoplasts. It has general relation to the polymerization of unsaturated organic compounds having a polymerizable group of the halogeno ethylene type, the polymers and copolymers of which are insoluble in their monomers. It is specifically related to the manufacture of thermoplasts from vinyl and vinylidene halides of which vinyl chloride, vinylidene chloride, fluoroethylene and chloro fluoroethylene are the most useful. The invention includes copolymers and interpolymers of such compounds. The specific invention includes apparatus for carrying out the novel method, a novel improvement in the method, and is a continuation in part of my copending application Serial No. 341,609, now Patent No. 2,715,117, August 9, 1955.

There are several methods of making such thermoplasts, of which the method by polymerization of the monomer in bulk has only recently been made successful. Bulk polymerization, which is generally considered to be by polymerization in liquid phase in the absence of solvents and diluents, produces products which are possessed of certain properties that are quite superior to those of polymers produced from identical monomers by other methods. Superior heat resistance is one such property.

Despite the advantages of the product, the difficulties of the method were very great, so that other methods were exclusively adopted in industry until Sans developed a successful process on behalf of the assignee of this invention. Among the difficulties of the bulk process, in connection with vinyl chloride thermoplasts, are the facts that the monomer is a gas at atmospheric temperature, that it has to be liquified in an autoclave, that it tends to develop degraded aggregates, and that the polymer tends to adhere to the wall of the autoclave as an insulating crust. The polymerization reaction is exothermic and the existence of such crust inhibits the production of a satisfactory product, indicating the use of specially designed scraper agitators driven from a motor outside the autoclave.

It has been established that during the bulk polymerization for the production of the thermoplasts of the type indicated all the material undergoing polymerization takes a powdery form very rapidly. For example, working with polyvinyl chloride, the powder state is attained when only about 25% of the mass is actually polymerized. That state is not conducive to good heat transference or to the uniform discharge of excess heat of reaction, and even the best agitators and mixers produce results that are imperfect.

These problems do not arise in the manufacture of thermoplasts that are soluble in the monomer, whereas this invention is particularly useful in the problems arising about vinyl and vinylidene halides, fluoro and chlorofluoroethylene, the polymers or copolymers of which are insoluble in the monomers or monomeric mixtures. As the degree of polymerization and the quality of the product depend upon the temperature of polymerization, as the temperature of the exothermic reaction must be controlled to produce a useful and reasonably uniform product, and as the control of the temperature takes place externally by cooling the wall of the autoclave, creating zones of different temperature in the polymerization mass, the process is still beset by difficulties and irregularities in process and product.

The new method abandons the agitation of the mass within the autoclave and proceeds by the fluidification of the solid polymer as it is formed in the nonsolvent monomer. Fluidification is to be understood as putting all the solid particles of polymer into a state of activity which resembles fluidity or liquidity. As an example, consider a mass composed of powder placed in a receptacle. If one drops a heavy object on the mass, for instance a heavy lead ball, the ball makes a shallow dent in the surface of the mass of powder, but has little other effect, but if the power is activated by insufflation by a gas, or by violent internal agitation, the same ball will sink deep into the powder and may even pass through and strike the bottom of the receptacle. That state of solid particles is called fluidification and it is an accomplishment of this invention that the fluidification of the polymer has been accomplished in situ as it is formed.

Because the operation occurs in a sealed autoclave, which eliminates the possibility of using insufflation to establish the fluidified state, and because even the best agitators are only partly successful in maintaining an even dispersal of the heat of reaction and do not produce this state, it has been necessary to invent novel means to accomplish fluidification during polymerization within an autoclave.

The parent application thus has as an object a process for making thermoplasts, comprised by polymers, or copolymers, insoluble in the monomers, by polymerizing the monomers in bulk (in mass) while maintaining the polymerization mass in a fluidified state, and it includes a novel means and apparatus for producing and maintaining the fluidified state, including a horizontal autoclave containing rolling members, as therein described.

It is indicated in the parent case that to obtain products containing a small percentage of low polymers, it is desirable to terminate the polymerization before complete transformation of the monomer, which leaves a certain amount of monomer to be eliminated from the powdery polymer and recovered, which can be done by distillation from the polymer and condensation in an external condenser, the autoclave being raised to a sufficient temperature and the condenser being cooled below the boiling point of the lowest boiling monomer.

A material difficulty existed during the discharge of the monomer from the polymer because the powdery polymer lost its fluidified state and settled down in the lower part of the apparatus as soon as the autoclave stopped turning. The monomer in the depths of the mass could not easily escape through the mass of polymer above it, the distillation was made difficult, and the time of the process was extended. It was necessary to discharge some monomer, rotate the autoclave to bring the polymer at the bottom to the surface, release more monomer, and so on, until recovery was completed. When the monomer constituted 15–25% of the total charge, it was usual to employ 4 to 6 successive releases of monomer and rotations of the autoclave, with accompanying connection and separation of the discharge line from the condenser to the autoclave.

An object of the invention is to reduce the duration of the manufacturing operation.

Another object is to secure a more perfect recovery of monomer.

Another object is to produce a more uniform and purer polymer.

A further object is to improve the polymerization apparatus, particularly by providing means whereby the monomer can be continuously discharged and condensed as the autoclave is continuously rotated, but which is positively sealed during the polymerization. Yet another object is to provide novel means of unsealing the discharge means when the time comes for the removal of monomer.

The objects as to apparatus are accomplished, generally speaking, by providing, in an autoclave having a rotating cylinder or drum, a discharge tube having a sealed discharge orifice which is maintained above the level of the solid and liquid reaction mass, and which has, outside the autoclave, fluid pressure means to break the seal and permit the escape of monomer or other gases while the autoclave is continuously rotated.

The objects as to method are accomplished, generally speaking by maintaining the fluidified polymer in a fluidified state during the discharge of residual monomer.

According to a preferred form of the invention, the outlet tube is bent, enters the autoclave at one end along its axis of rotation, and has a discharge orifice inside the autoclave above the level of the reaction mass. As the tube does not rotate with the autoclave, the level of the fluidified polymer is always below the outlet orifice. The outer end of the tube is connected to a condenser for the monomers discharged. The discharge orifice is sealed, within the autoclave, before the autoclave is charged with monomer, by a sealing disk impermeable to gas but capable of being ruptured by the application of sufficient force, mechanical or fluid. At the time for the distillation of the monomer, the sealing disk is broken by such force admitted through the tube. Nitrogen gas, which is an example of an inert fluid, has been used satisfactorily to break the disk by admitting it under pressure to the discharge tube while the autoclave is still turning. Once the disk is broken, the temperature of the autoclave may be permitted to rise until the monomer distills off to the condenser, while continuing the rotation of the autoclave and thus continually bringing new masses of polymer to the surface and facilitationg the quick release of absorbed monomer.

The invention greatly improves the distillation of any residual monomer and reduces the length of the manufacturing cycle, compared to that formerly used in which it was necessary to interrupt the rotation of the autoclave to release the monomer. In this invention the autoclave may be rotated throughout the distillation of the monomer, thus maintaining the fluidified state of the polymer, facilitating the release of monomer, shortening the time required for distillation of the monomer, and reducing the quantity of monomer retained in the polymer, and thus producing a purer product.

The apparatus has the advantage that crusts cannot form over the discharge orifice, which is held well above the polymerization mass at all times, polymerization cannot take place in the discharge tube, and the rending of the disk and inflow of inert fluid just before distillation would dislodge into the autoclave any loose matter that might accidentally attach itself to the discharge pipe orifice.

A further advantage of the invention is that the discharge tube establishes a permanent connection with the interior of the autoclave, and permits the exercise of certain controls over the polymerization that were not previously possible by instruments attached to the wall of the autoclave. Thus, it is possible to measure the temperature of the interior of the autoclave at every instant and thus to control it continuously, by mounting measuring instruments on the discharge tube and bringing the connections to recording instruments out at the axis along which the tube enters the autoclave. Thus the polymerization may be better and more uniformly conducted and as a result the polymers are more homogeneous and the granules are of more desirable and more uniform size. Other instruments such as level indicators can also be mounted on the discharge tube to indicate, e. g. the level of the monomers when the autoclave is being filled.

The figures of the drawing illustrate a preferred form of the invention.

Fig. 1 is an elevational view particularly in section of a horizontal rotary autoclave for the polymerization of materials of the kind described in a fluidified mass.

Fig. 2 is a vertical section through a discharge tube of the type employed in this invention.

Referring now to the numerals of the drawing. Horizontal cylindrical autoclave 1 is sealed at its ends by heads 6—7 which are connected to the cylindrical body by walls or other fluid-type connections. A water jacket 2 encircles the cylinder and receives water for controlling the temperature of the reaction mass inside the autoclave through water inlet 3 and pipes 5 and discharges it through pipes 5' and outlet 4. The particular construction of the water cooling system is not a part of the present invention and it has been shown only diagrammatically.

At the middle of the cylinder 1 is a conical manhole 8 which is closed during the polymerization by a plug 8a which is provided with an inner surface conforming exactly to the curvature of the cylinder, so that, when in place, it forms a symmetrical part of the wall of the autoclave. Two circular tracks 9—9' encircle the autoclave and are supported for rotation upon a train of rollers 9a—9'a. The autoclave is rotated by means of a toothed crowned gear 10 attached to the autoclave and meshing with a pinion gear 10' which is driven through a reduction gear 10a by a motor 10b.

A row of heavy metal balls 30 having several extra balls 31 beyond the number required to extend from end to end of the autoclave, rolls on the bottom generatrix of the cylinder as the autoclave is turned and maintains the mass of polymer and monomer 32 in a fluidified condition.

It is not sufficient to operate the autoclave as though it were a ball mill as such means are ineffective. It is our discovery that the speed of rotation and the density, size and number of the rollers have an important bearing on the success of the new process. The speed of rotation communicated to the apparatus has an important influence on the fluidification of the reaction product; to secure a satisfactory result, the autoclave must be rotated within a limited range of speed. The preferred speed of rotation is between 20 and 30 meters per min. That range of speed is a function of the diameter of the apparatus, or, in other words, an important thing is the tangential velocity of the periphery of the internal cylindrical wall of the autoclave, which we shall call the peripheral or circumferential velocity. If that speed is too low, the polymer remains in a compact condition and is not fluidified, the thermal exchanges through the wall of the autoclave are irregular and poor and the results are unfavorable. For autoclaves of industrial type having a diameter of 50–100 cm., good fluidification of a substantial part of the polymer begins at a peripheral speed of about 18 meters per min. and as the speed is increased, the whole polymer is rapidly fluidified, but if the speed is increased to the order of about 100 m./min., a certain quantity of the polymers tends to adhere crusts on the wall, eventually forming a cylindrical lining more or less compact, and if the speed is still further increased, for instance, to 200 m./min., all the polymer in the autoclave will be packed against the wall of the autoclave by centrifugal force. Consequently, the fluidified state is maintained satisfactorily only at speeds between about 20 and a little less than 100 m./min., but from the standpoint of good practice, the low speeds in that range (20–30) should be employed because they give good results, do not needlessly increase the power consumed by the apparatus, and do not needlessly increase the wear and strain on the apparatus.

It is a part of this invention to have established that the dimensions, the density, and the number of the inert rollers have an influence on the results obtained, and these factors should be chosen so that these rollers are constantly in contact with the wall, and preferably extend from end to end in a line in which each has contact with others. We have discovered that rollers that are too light, either by reason of too small diameter or of too small density will occasionally depart from contact with the wall during rotation and have a tendency to be carried inward toward the axis of the cylinder. That phenomenon is undesirable and to be avoided and can be overcome by increasing the weight of the rollers, which generally speaking are balls, either by increasing their weight or their density. However, rollers of very small diameter are not desirable, being inefficient compared to those of greater diameter.

In order to obtain a suitable working of the whole surface of the autoclave, which is advantageous especially in those of large size, for instance, having a diameter of a meter, it is advantageous to use balls of 10 to 12 or even 15 cm. diameter and of a density at least 6; lead balls or iron balls or hollow inert balls of any material filled with lead or other heavy material. The rollers need not be of equal diameter, but may be of different size and weight so long as they will follow the wall and not wander inwardly. A single line of balls is sufficient, but it is advantageous to supply one or two extra, or even a second line of balls, to provide and compensate for the movement of the balls out of the line of the lowest generatrix of the cylinder. It is not advantageous to use more than two lines of rollers and it is undesirable to supply the autoclave with plural layers of balls as in ball mill practice.

The autoclave is provided with a filling pipe and valve 11—11' and with a relief valve 12' and pipe 12 for the discharge of gases which may be entrapped before polymerization begins.

The head 7 has a stuffing box 15 through which passes a pipe 13, to the inner end of which there is attached by a union 17, a goose neck pipe 16 having a screw-threaded end 19 encircled by a flange 19' which serves as an abutment. This tube forms an important part of the invention and does not rotate with the autoclave but is maintained with the goose neck in upright position, as shown, at all times by support 33 in which its outer part is mounted. This tube serves for the evacuation of the monomer after the polymerization has been carried to the extent desired. A washer 34 encircles the screw-threaded end 19 and abuts flange 19', against which it is held in sealing contact by the body 18a of the sealing cartridge 18 which is screw-threaded at 18f on the end 19. The other end of the body 18a contains a circular groove 18g in which is mounted a gas-tight disk 18b, which is held in place by a sealing ring 18c which is held in sealing engagement therewith by a sleeve 18b which is screw threaded onto the body 18a, thus, until it is desired to break disk 18b, the tube 16 is sealed at its inner end so that polymerization cannot take place within it.

The outer end of the tube is connected at 20 to a condenser which receives the gaseous monomer and condenses it when its discharge is decided upon, for instance, when the polymerization has sufficiently proceeded.

A manometer 22 can be attached to the tube if desired for the purpose of giving information concerning pressure conditions in the tube or in the inside of the autoclave.

The sealing disks can be made of materials such as aluminium foil.

In many cases one can simplify the apparatus by closing the same only by a valve outside the autoclave instead of closing it inside the autoclave by sealing disk 18b. The cartridge 18 may then be omitted. For this reason a valve is also provided, outside the autoclave, in the discharge pipe, at 20.

These disks are of rupturable material which have sufficient tenacity to withstand the working pressures in the autoclave.

When it is desired to break the seal 18b, inert gas is admitted by pipe 13 to pipe 21 until the pressure is sufficient to rupture the disk 18b, thereafter the liquid monomer remaining in the reaction mass can be distilled off by proper temperature control, allowing the temperature within the autoclave to rise until distillation of the monomer takes place. Meanwhile the rotation of the autoclave continues and the balls 30 work their way through the mass and maintain it in its fluidified state so that the fluidified condition contributes to the rapid evaporation and condensation of the residual monomer. The volatilized monomer passes out through pipe 16 to the condenser. Before the next polymerization the broken disk is removed from pipe 18 and replaced with an unbroken disk to again seal the inner end of the pipe 16, or a new cartridge is emplaced.

The operation is as follows:

The manhole being open, a row of balls extending from end to end of the cylinder is emplaced in accordance with the principles enunciated in the said prior application and the cartridge 18, provided with its sealing disk, is put in place. These cartridges may be made up as a unit outside the autoclave and emplaced by screwing them on the end 19. The manhole having been closed by the plug, vinylchloride or other monomers of the type hereinbefore described are introduced in liquid phase, together with catalysts and other such aids to polymerization or quality as good practice dictates. As the autoclave is filled, air is released through outlet 12', going to a place, not shown, wherein gaseous vinylchloride is recovered. In order to completely clear the autoclave from air, enough vinylchloride can be evaporated to thoroughly scavenge the upper regions of the autoclave. Thereafter the valve 12' is closed and the autoclave is rotated, the temperature being maintained at that which is most favorable to polymerization by flowing water through the water jacket.

After the polymerization ends, which can be determined by the diminution of the exothermicity of the reaction and by a material reduction in the interior pressure of the autoclave, the rotation of the autoclave is continued, but preferably at reduced speed, while maintaining the same temperature. The sealing disk 18b is now broken by nitrogen pressure received through pipe 21. The disk breaks at a certain pressure and the monomer escapes by the tube 13—16 and condenses in condenser 20. When all the vinyl chloride (monomer) has escaped from the autoclave, the rotation of the cylinder is stopped, the manhole is opened, and the polymer is removed.

The following example illustrates the best mode of carrying out the process.

In a cylindrical autoclave of 2.8 cu. meter internal capacity, similar to that described in the Example 3 of my copending application Ser. No. 341,609, but provided with a discharge pipe according to the present invention, and containing 69 lead loaded steel balls having 100 m./m. diameter, one introduces 1000 kgms. of liquid vinyl chloride and 0.02% by weight of polymerization catalyst. The autoclave is rotated at 10 R. P. M. and the temperature is maintained at 60° C. by circulation of water in the jacket of the autoclave. After 16½ hours the rotation speed is lowered to 5 R. P. M. and then the sealing disk of the discharge device is broken by nitrogen pressure, and the monomeric vinylchloride impregnating the pulverulent polymer escapes from the autoclave and is received and condensed in suitable condenser. After 3 hours the rotation of the autoclave is stopped and the polymer is discharged by the manhole. This polymer retains less than 3% by weight of monomer.

It must be noted by comparison that if the autoclave had not been provided with the discharge device of the present invention, the discharge of the monomer should have taken 6 to 7 hours and thus the duration of the operation would have been increased by 3 or 4 hours.

Moreover the polymer obtained should have retained an average of 13% of monomer by weight.

Among the advantages of this invention are that the discharge tube for monomer is always above the reaction mass and is impermeable to solids, liquids and gases until it is desired to permit the escape of monomer. The method of breaking the seal is novel and involves no moving parts, being readily operated from outside the autoclave, pneumatically. The fluidified state is maintained throughout the vaporization of monomer and the monomer is discharged faster and more completely than is reasonably possible by earlier methods.

The sealing disk may be used as a safety valve for the autoclave, by leaving the exterior valve open, and can be broken by a dangerous rise in internal pressure, which is immediately relieved.

As many apparently widely different embodiments of the present invention may be made without departing from the spirit and scope thereof, it is to be understood that the invention is not limited to the specific embodiments.

What is claimed is:

1. Apparatus for the manufacture of thermoplastic comprising a sealed cylindrical autoclave, means to mount the autoclave with its longitudinal axis horizontal, means to rotate the autoclave about said longitudinal axis, a discharge tube extending from outside to within the autoclave, means forming a seal between the tube and a wall of the autoclave, means to retain the tube from rotation, the portion of the tube within the autoclave having an orifice offset from the axis of the latter to a position above the level of the thermoplasts in the autoclave, means to seal the said orifice of the tube within the autoclave comprising an imperforate sealing disk mounted in and sealing the end of said tube, and fluid pressure means connected to the tube externally of the autoclave, and selectively operable to break said disk.

2. Apparatus for the manufacture of thermoplasts as set forth in claim 1, comprising condenser means connected to the said discharge tube outside said autoclave.

3. Apparatus for the manufacture of thermoplasts as set forth in claim 1 wherein the discharge tube extends axially through and is sealed to an end of the autoclave.

References Cited in the file of this patent

UNITED STATES PATENTS

| | | |
|---|---|---|
| 1,120,697 | Dehn | Dec. 15, 1914 |
| 1,721,034 | Ostromislensky | July 16, 1929 |
| 1,834,605 | Dassonville | Dec. 1, 1931 |
| 1,862,557 | Wendler | June 14, 1932 |
| 1,879,479 | Punnett | Sept. 27, 1932 |
| 2,062,381 | Tryon et al. | Dec. 1, 1936 |
| 2,317,836 | Weaver | Apr. 27, 1943 |
| 2,474,826 | Cautlin | July 5, 1949 |
| 2,479,360 | Howard | Aug. 16, 1949 |
| 2,600,695 | Sans | June 17, 1952 |
| 2,715,117 | Baeyaert | Aug. 9, 1955 |

FOREIGN PATENTS

| | | |
|---|---|---|
| 606,116 | Great Britain | Aug. 6, 1948 |